United States Patent
Scoble

(10) Patent No.: US 7,149,707 B2
(45) Date of Patent: Dec. 12, 2006

(54) METHOD AND APPARATUS FOR COMPENSATING A PLURALITY OF FRANCHISE PARTICIPANTS IN A MULTI-LEVEL SALES FORCE

(75) Inventor: Charles Scoble, Santa Rosa, CA (US)

(73) Assignee: Avalar Network, Inc., Rohnert Park, CA (US)

( * ) Notice: Subject to any disclaimer, the term of this patent is extended or adjusted under 35 U.S.C. 154(b) by 982 days.

(21) Appl. No.: 10/104,533

(22) Filed: Mar. 25, 2002

(65) Prior Publication Data

US 2003/0182187 A1 Sep. 25, 2003

(51) Int. Cl.
G06Q 30/00 (2006.01)
(52) U.S. Cl. ........................................ 705/14
(58) Field of Classification Search ................... 705/14
See application file for complete search history.

(56) References Cited

U.S. PATENT DOCUMENTS

| | | | | |
|---|---|---|---|---|
| 5,537,314 A * | 7/1996 | Kanter | ......................... | 705/14 |
| 6,134,533 A * | 10/2000 | Shell | ............................ | 705/26 |
| 6,578,010 B1 * | 6/2003 | Teacherson | ................... | 705/14 |
| 6,615,187 B1 * | 9/2003 | Ashenmil et al. | ......... | 705/36 R |
| 2002/0029177 A1 * | 3/2002 | Smisek | ......................... | 705/30 |
| 2002/0198779 A1 * | 12/2002 | Rowen et al. | ................. | 705/14 |
| 2004/0059683 A1 * | 3/2004 | Epstein et al. | ................. | 705/64 |

FOREIGN PATENT DOCUMENTS

CA 2305920 * 4/2000

OTHER PUBLICATIONS http://www.awss.com/mkt_m/01.htm. Dec. 8, 2000. ☐☐Website describing multi-level marketing and its application to the real-estate sector.*
Giacomin, Gordon. "Paired for Life." CAmagazine. Nov. 1999.*

* cited by examiner

Primary Examiner—Eric W. Stamber
Assistant Examiner—Tri Nguyen
(74) Attorney, Agent, or Firm—Barnes & Thornburg LLP

(57) ABSTRACT

A method and apparatus for compensating a plurality of participants selling, leasing or managing property or originating loans. The method includes the steps of forming a multi-level sales force, collecting royalty fees from each participant, placing the collected fees in a revenue sharing pool, and distributing royalty fees from the pool based upon the sponsorship level of each participant relative to the other participants. A data processing system including a computer processor with memory and a data processing program for controlling distribution from the revenue pool is also disclosed.

30 Claims, 4 Drawing Sheets

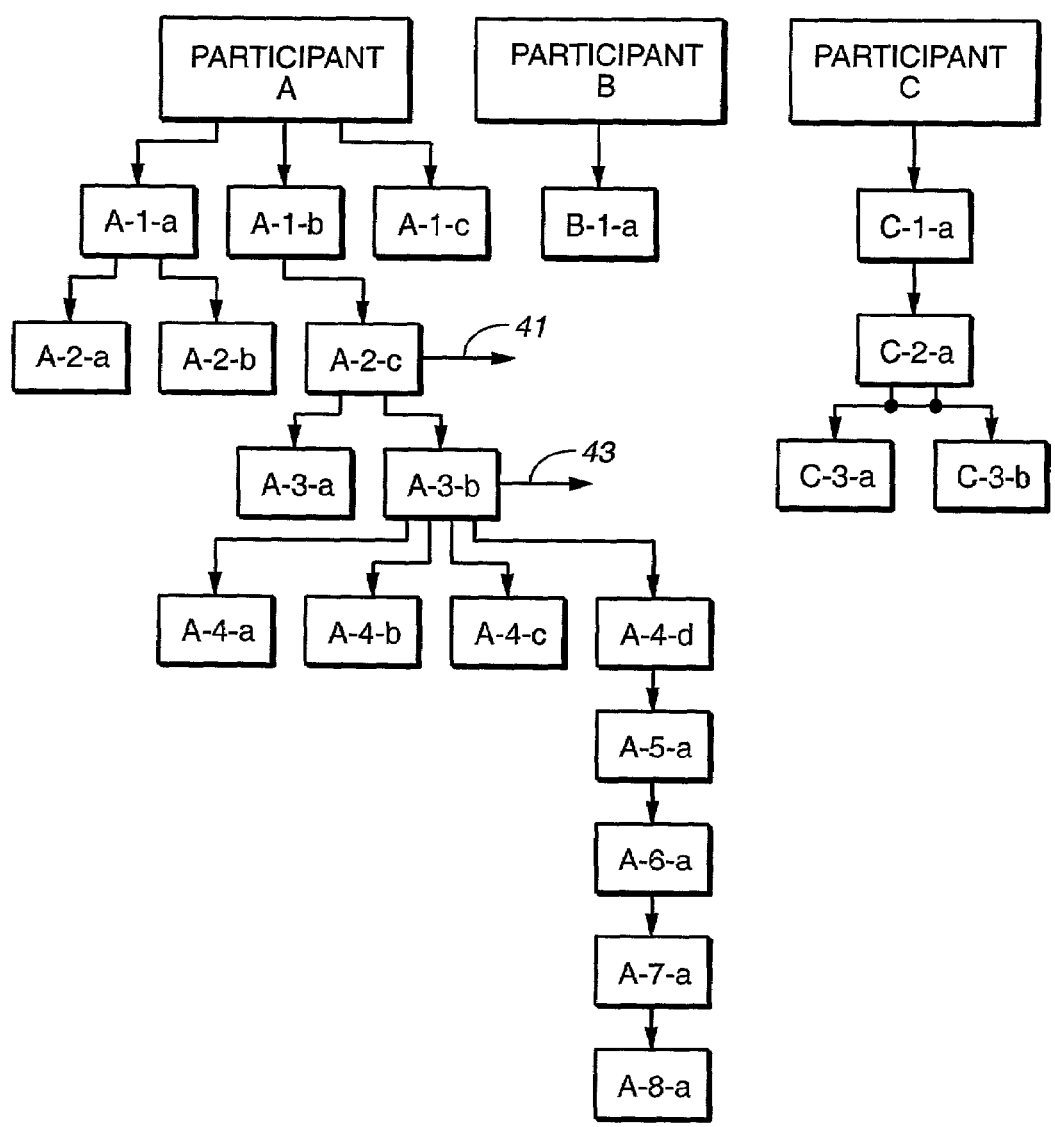
FIG._1

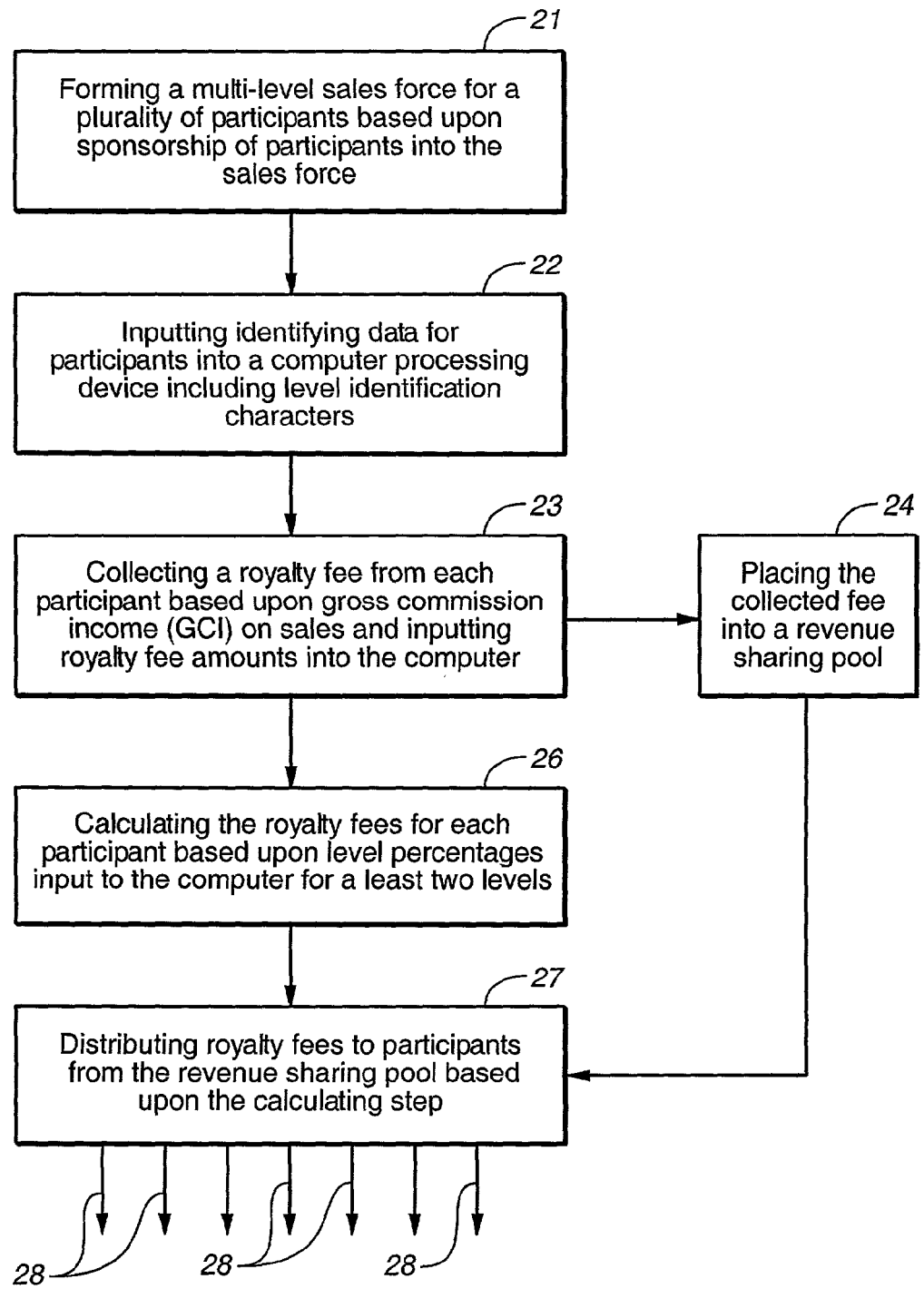
FIG._2

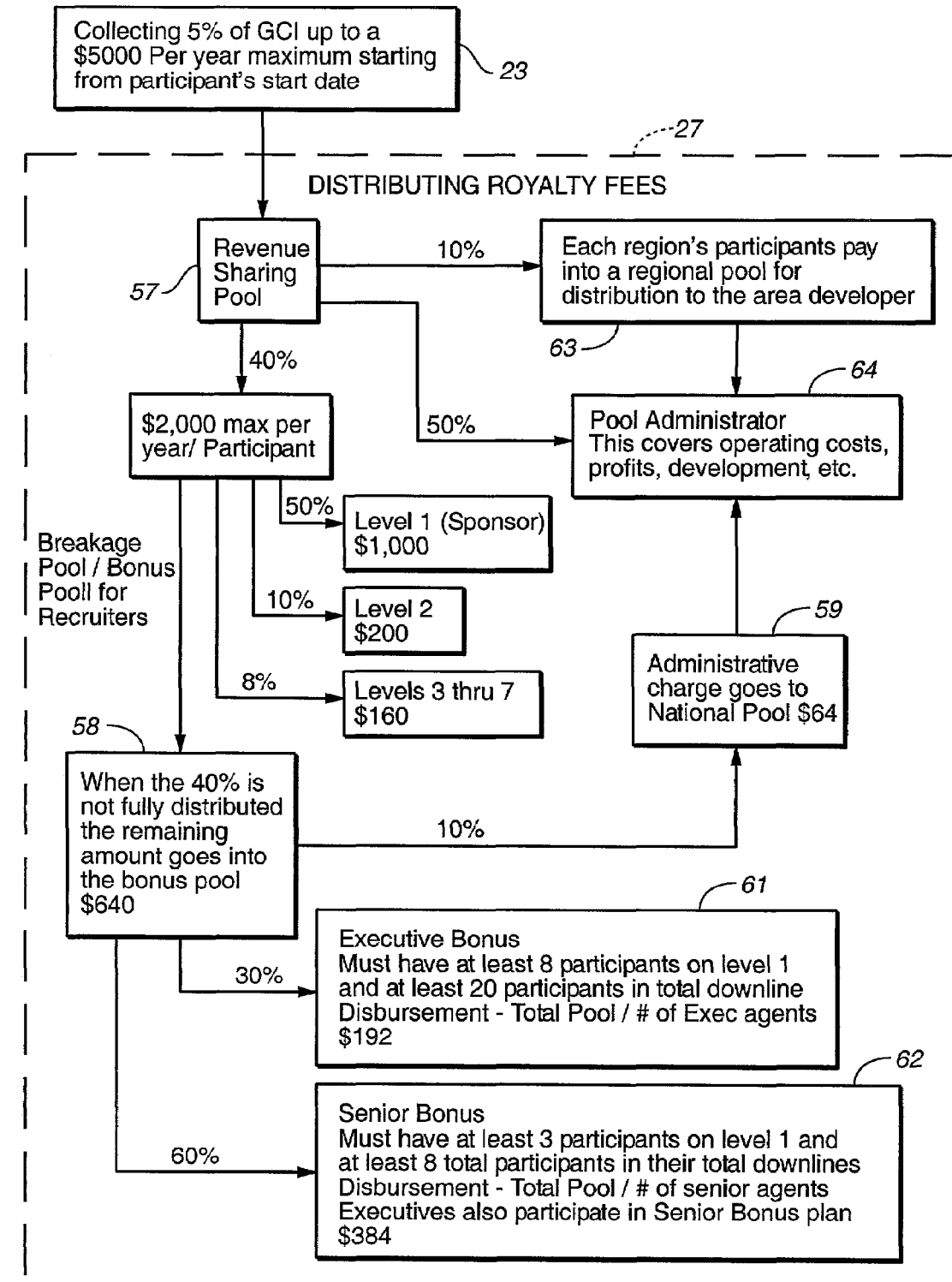
FIG._3

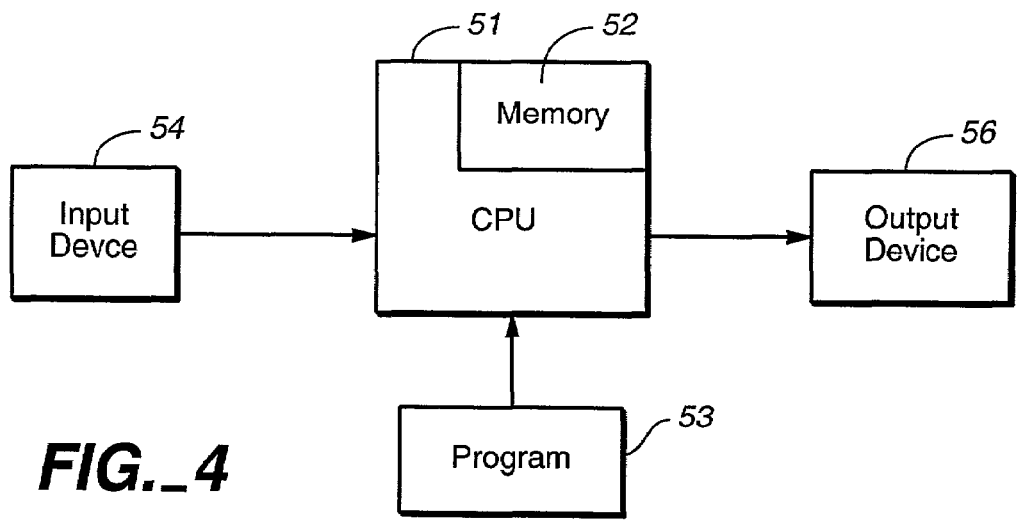
FIG._4
| 1st LEVEL | $1,000 | $1,000 | $1,000 | $1,000 | $1,000 | $1,000 |
|---|---|---|---|---|---|---|
| 2nd LEVEL | $200 | $200 | $200 | $200 | $200 | $200 |
| 3rd LEVEL |  | $160 | $160 | $160 | $160 | $160 |
| 4th LEVEL |  |  | $160 | $160 | $160 | $160 |
| 5th LEVEL |  |  |  | $160 | $160 | $160 |
| 6th LEVEL |  |  |  |  | $160 | $160 |
| 7th LEVEL |  |  |  |  |  | $160 |
FIG._5

METHOD AND APPARATUS FOR COMPENSATING A PLURALITY OF FRANCHISE PARTICIPANTS IN A MULTI-LEVEL SALES FORCE

TECHNICAL FIELD

The present invention relates, in general, to methods for the compensation of members of a sales force, and more particularly, relates to the compensation of real estate sales agents and mortgage brokers in a multi-level sales force in which various agents sponsor other agents into the sales force.

BACKGROUND ART

Traditionally, real estate and mortgage brokerage offices employ a plurality of sales agents which they pay on a commission basis. For each sale or listing made by an agent, a sales commission is paid according to the local market conditions as to the amount of such commissions. The brokerage through which the sales are made will collect from each agent a percentage of their sales commissions, or they will charge the agent a monthly "desk fee."

This economic sales model, however, does not normally provide an incentive for agents to attract other good agents to the brokerage firm, nor does it provide for any retirement or residual income to agents once their sales have stopped. Most real estate brokerage firms do provide for commission sharing between multiple agents when they participate in the listing or sale, but the economic incentive for teamwork is generally not very great, and agents have little incentive to assist in, or take major responsibility for, the training of other agents.

Sales agents are notoriously laterally mobile. They move from one brokerage firm to another as a result of even modest economic inducements. This is highly disruptive to brokerage firms and often generates considerable ill will.

What is needed is an economic revenue sharing method which will enhance the recruitment and retention of agents selling, leasing, and managing real estate and originating real estate loans. Such a model should also encourage teamwork and provide the agents with economic security and retirement income after the agent's sales are terminated. Any such revenue sharing method must be capable of significant returns which are achieved over time rather than at the expense of reducing commissions for sales below a competitive level.

Accordingly, it is an object of the present invention to provide a method and apparatus for compensating participants in a sales force which encourages recruiting, retention and training of the participants, as well as providing a revenue sharing method that is not implemented at the expense of competitive commissions for sales.

Another object of the present invention is to provide a method for revenue sharing in a real estate and mortgage sales force which employs a multi-level structuring of the sales force and revenue sharing among levels so as to provide for residual income, retirement income and death benefits for participants.

The method and apparatus for compensating participants in a multi-level sales force of the present invention has other features and objects which will become apparent from, and are set forth in more detail in, the accompanying drawings and the following description of the Best Mode of Carrying Out the Invention.

DISCLOSURE OF THE INVENTION

The present invention of compensating a plurality of participants originating mortgages or selling, leasing or managing properties comprises, briefly, of the steps of forming a multi-level sales force from the participants based upon their sponsorship of other participants into the sales force. The multi-level sales force should have at least two levels subsequent to the sponsoring agent. The next step in the method is collecting a royalty fee from each participant in the sales force based upon revenue generated by the sale (or listing), leasing or financing of property by the participant. The method includes placing the collected royalty fees into a revenue sharing pool, and distributing royalty fees from the revenue sharing pool to the participants based upon level percentages of the royalty fees paid into the pool by the various levels of participants. In the preferred method a multi-level sales force with up to seven levels is formed, and the level percentages is paid to the participants are the greatest at the lowest levels and decrease as the level or generation from the sponsoring participant increase. Representation in the multi-level sales force is compressed when a non-vested participant agent leaves the sales force. Vesting in a residual share from the revenue sharing pool occurs over time and a payout continues upon death or departure of the sponsoring participant.

The apparatus for compensating a plurality of participants in a multi-level sales force of the present invention is comprised of a data processing system including a memory device for storing identifying data for each participant in at least a two-level sales force, and a data processing program controlling the operation of the computer processor and form the processing royalty fee data by allocating a portion of the royalty fees input as being paid into the revenue sharing fund by each participant among each sponsor participant in each level of the sale force according to level percentages in order to output a shared royalty to be paid from the revenue sharing pool to each participant.

BRIEF DESCRIPTION OF THE DRAWINGS

FIG. 1 is a schematic diagram illustrating the step of forming a multi-level sales force in the method of the present invention.

FIG. 2 is a flow diagram illustrating the steps of the method of the present invention.

FIG. 3 is a detailed flow diagram of one economic model implementing the method of the present invention.

FIG. 4 is a schematic representation of an apparatus suitable for implementing the method of the present invention.

FIG. 5 is a schematic representation of the level payouts occurring under the distributing step illustrated of the economic model of FIG. 3.

BEST MODE OF CARRYING OUT THE INVENTION

The method and apparatus of the present invention are particularly well suited for use in the real estate and mortgage brokerage industries, but they could be applied to other analogous property sales applications. The system of the present invention is based upon the use of a franchise system in which franchisees collect and bundle data and modest royalties from each participant for each sales event and then distribute a portion of the collected amounts back to the participants based upon the data as to sponsorship of other participants into the sales force. By employing multiple levels of sponsorship, each participant has the potential to have a tree of subsequent sponsored participants who will be generating revenue for the original sponsor.

Referring now to FIG. 1, a multi-level sales force is schematically illustrated. In a conventional brokerage system a plurality of agents are essentially selling entirely for their own account and to a small degree for the brokerage firm, either in the form of desk fees or commission sharing. The agents are not organized in any manner based upon sponsorship.

In the method of the present invention an administrator entity, or clearing house, establishes franchises in which the franchisees set up multi-level sales forces and administer with the administrator's help the present method.

A first step of the present invention, therefore, is to form a multi-level sales force from the participants based upon sponsorship of the participants into the sales force. This step is illustrated in FIG. 2 as step 21, and FIG. 1 illustrates one such sales force. Assuming that the franchise is initially comprised of three agents or participants A, B and C, who might be the three agents who formed a brokerage firm. After organization of the firm, participant A recruited three agents A-1-a, A-1-b and A-1-c to sell or lease real estate or originate loans through the brokerage firm. Original founders B and C also directly brought in agents B-1-a and C-1-a. The five agents who are directly hired by the founders, therefore, form the first or generation level of a multi-level sales force after the founders.

Agent A-1-a can be seen to have recruited two agents, namely, A-2-a and A-2-b, while participant or agent A-1-b also brought an agent, participant A-2-c, into the system and agent C-1-a brought in a second level participant, namely, C-2-a. There are, in the example of FIG. 1, therefore, four participants in the second level of the multi-level sales force.

As will be seen in the illustration of FIG. 1, the sales force continues to levels 3, 4 and 5, and it will be seen that founder or original sponsoring participant A has many more agents and levels or generations of agents than the other two founders, B and C.

As noted above, tracking of the levels of sponsorship or the generations of agents has not been done to any significant degree in prior real estate or mortgage brokerage systems, and basing revenue sharing on the levels of the sales forces having more than one level of sponsored participants has not occurred. The method of the present invention, therefore, employs the plurality of levels to enhance the total compensation which participants can receive, as well as to create revenue sharing enhancements, such as "compression," which will be described below.

The next step in the method of the present invention is step 23 in FIG. 2, namely, the collecting of a royalty fee from each participant based upon the participant's revenue generated by the sale, leasing or management and/or financing origination by the participant. In most cases, as indicated in FIG. 2, the collecting step is based upon the gross commission income (GCI) which the participant receives. As is conventional in the real estate and mortgage brokerage industries, listing agents typically receive a commission for listing of a property when it is sold and the agent who actually makes the sale, which can also be the listing agent, also receives a commission on the sale. Under the method of the present invention it does not matter whether the GCI of the participant is based upon a listing or loan origination.

The amount collected from the participant's GCI should be relatively small. In the example of the present invention a royalty fee of 5% of the GCI is preferably used in that it is not so significant as to burden the participant and yet provides significant residual income potential by reason of the multi-level organization of the sales force shown in FIG. 1. It will be appreciated, however, that the royalty fee collected can vary considerable in implementing the method of the present invention.

The next step is that the collected royalty fees are placed in a revenue sharing fund, as indicated by step 24 in FIG. 2. In the preferred embodiment of the present invention the collecting step occurs over a relatively small time period, for example, two months. The royalties which are collected by the franchisee for sales, leases and loans by participants during the two month period are entirely distributed from the revenue pool at the end of each two month period.

It will be understood that longer collection periods can be established, and it is not an absolute requirement that all the revenues be distributed from the pool at the time of distribution to participants. The advantage of short collection periods and distribution of all of the collected funds are relatively immediate income to the participants and the lack of any need to invest funds and unduly complicate the revenue sharing pool accounting burden.

The next step in the method of the present invention is step 27 shown in FIG. 2 of distributing royalty fees from the revenue sharing pool to the participants based upon sponsorship in the multi-level sales force. The distributing step employs the multi-level sales force organization of FIG. 1 by assigning level percentages to the various levels in the sales force. Thus, level 1 of the multi-level sales force may be assigned a first level percentage, while level 2 is assigned a second level percentage, level 3 a third level percentage, etc. These level percentages could be equal, but in the preferred method, the levels closest to the original sponsor participant are assigned higher level percentages. As will be seen in FIG. 3 one example would be for the first level to be assigned a level percentage of 50% of a $2,000 maximum allocation to participant payouts, the second level to be assigned a level percentage of 10% and the third levels and higher assigned a level percentage of 8%. Other level percentage assignments are within the scope of the method of the present invention.

In the example given, a sponsor or participant A, therefore, would be entitled to 50% of the royalty fees placed into the revenue sharing pool for the three agents A-1-a, A-1-b and A-1-c. If any of the agents in the second level made sales, leases or loans during the collecting period, participant A would be entitled to 10% of the commissions paid in by agents A-2-a, A-2-b, A-2-c. An 8% revenue sharing from agents A-3-a and A-3-b would occur, as well as a percent on the sales by agents in the fourth through seventh level of the sales force. This distribution example is also shown in FIG. 5.

It will be understood, therefore, by bringing in agents, training them to be effective and encouraging them to stay in the sales force, the original sponsoring participant A can leverage his or her revenue sharing out through seven generations or levels of subsequently entering participants in the sales force.

In the method of the present invention, each participant has a similar incentive. Thus, if agent A-2-c is considered, his personal sales tree would extend downstream with the various levels being stepped up. Agents A-3-a and A-3-b are first level participants with respect to agent A-2-c so that agent A-2-c receives 50% of the distributable commissions from agents A-3-a and A-3-b and 10% of the commissions from agents A-4-a, A-4-b, A-4-c and A-4-d. Each participant in the pool, therefore, is encouraged to sponsor further participants and will share revenue from participants which he or she has sponsored.

In the present system it is preferable that the revenue sharing not extend beyond the seventh level. It would be possible to go further downstream or into further generations or levels, but then adjustments to the distribution level percentages probably would be made. While sales by agent A-8-*a* would not yield any revenue sharing to founder participant A, they would generate revenue sharing for A-1-*b* and A-2-*c* because participant A-8-*a* is within seven levels of these two earlier sponsors.

One of the features of the method of the present invention is that revenue sharing from the revenue pool can include a "compression" feature in which the distributing step is accomplished by distributing royalty fees at a level percentage determined by reducing the original level percentage of the sponsored participant's level by the number of non-vested level participants who have left the sales force at the time of performing the collecting step 23. Possible vesting rules are set forth below. Referring again to FIG. 1, if participant A-2-*c* were to leave the sales force before having a vested interest in royalties paid, as indicated by arrow 41, all of the subsequent generations of participants would move up one level as the upstream participants A-1-*b* and founder A. If non-vested participant A-3-*b* also were to leave the sales force, as indicated by arrow 43, all the fourth level participants would move up to second level participants as would all of their downstream or later generation agents. Participants A-3-*a* would then be on the same level as participants A-4-*a* through A-4-*d*, namely, the second level or generation as far as founder A is concerned.

This compression step can also result in agents such as A-8-*a* who were originally not a basis for compensation of founder A to be a source for revenue sharing for founder A.

Another feature of the method of the present invention is that the right of a participant to receive royalties can vest. When participant A-2-*c* leaves the sales force, for example, he may still have the right to receive revenue sharing, that is, a residual income can vest over time if the participant has been in the sales force for a long enough period of time. Preferably the participant's vesting occurs in gradual steps over time. For example, vesting in revenue sharing might begin at year 3 of participation in the sales force and continue at 20% per year until the participant is fully vested at year 7. As will be appreciated other vesting schemes can be employed.

Vesting over time encourages participants to stay in the sales force on the one hand and assures them that there will be residual income even after they leave on the other hand. The same kind of vesting can be used for participants who die or become disabled. For death and disability, however, it is preferred that the residual income also decreases or declines over time. An example would be that the first year after death or disability the participant's estate would receive 100% of the vested residual income, with the percentage declining by 20% each year thereafter so that the estate would have no interest in the vested revenue sharing after the fifth year, and compression would occur thereafter.

As will also be appreciated, other declining revenue sharing approaches can be employed.

The method of the present invention is preferably implemented using a data processing system for managing the revenue sharing between the participants in the multi-level sales force. The data processing system is schematically shown in FIG. 4 and includes a computer processor or CPU 51 having a memory device 52 for storing various data for each participant. A data processing program 53 can be provided or even reside in the CPU and the computer processor will include an input device 54 and an output device 56, as is well known for computer systems. Memory 52 must be capable for storing data identifying each participant as well as data identifying the level at which each participant is situated vis-a-vis each other participant so that a generational tree of the type shown in FIG. 1 is in effect stored for each participant in the sales force. Accordingly, as shown in FIG. 2, the step 22 will be undertaken using input device 54 so as to set up in the computer memory the participant identities and their position in the multi-level sales force using level identification characters or indicia.

The present method also can be seen from FIG. 2 preferably to include a calculating step 26 in which the collected fees are input through input device 54, as well as the desired level percentages which can be buried in, or form part of, program 53. The royalty fees paid in by each participant are also identified and input so that the amounts which are subject to the level percentages for each participant can be appropriately allocated. The program then processes the inputs to produce at output device 56 the computed amounts of revenue sharing from pool 24 to be distributed to each participant, as indicated by arrows 28.

EXAMPLE

An example of revenue sharing using the method and apparatus of the present invention can be understood by reference to FIGS. 3 and 5. In the example, 5% of the gross commission income (GCI) of each participant is put into revenue sharing pool 57 and input through input device 54 to CPU 51, with each royalty amount being identified by the participant. In the system of FIGS. 3 and 5, a maximum royalty fee of $5000 per year will be collected from the GCI of each participant. This cap on the royalty fees allows participants who are quite effective sales agents to limit the amount of their contribution to revenue sharing pool 57 and yet still be fully involved in the revenue sharing concept.

It is also possible to employ a decreasing percentage rather than, or in addition to, a cap. Thus 5% could be contributed on the first $100,000 and 2% on the next $200,000.

Assuming that a participant has placed $5000 in pool 57 it will then be distributed under distributing step 27 as shown inside the broken line box in FIG. 3. Forty percent of the $5000 or $2000 will go into the pool for sharing among the various levels of sponsoring participants. Assuming that the participant was participant A-3-*b* in FIG. 1, $1000 of the $5000 placed in the pool would be paid to his immediate sponsor, participant A-2-*c*, $200 would be paid to the sponsor's sponsor, namely, A-1-*b* and $160 would be paid to participant A. Since there are no further levels above the contributing participant A-3-*b*, only $1360 of the $2000 would be distributed, leaving $640 to proceed to a bonus pool 58. This bonus pool can then be paid into an administrative pool 59, an executive bonus pool 61 and a senior bonus pool 62 in percentages which can be, respectively, 10%, 30% and 60%. Pool 59 can be used for national advertising, pool 61 can be used to provide bonuses to participants who have brought a relatively large number of agents into the sales force and the senior bonus given to senior executives who have brought in many agents to the sales force, for example, as set forth in FIG. 3. If the participant who places $5000 into the revenue sharing pool is in the 7th level, then all of the 40% will be distributed to various levels above the contributing participant and no money will go into pool 58.

The revenue sharing pool can also be used to promote regional cooperation with an amount such as 10%, going into the regional development pool 63. Finally, a percentage, for example 50%, can go to the system administrator, as indicated by box 64, to cover operating costs, profits, further system development and the like.

FIG. 5 shows one approach to distributing the $2000 portion of the collected royalty fees among the various seven levels of the multi-level sales force.

If a participant has no sponsor, for example participant A, they still contribute to the revenue sharing pool, but the $2000 maximum per year passes through to the breakage or bonus pool 58. This would be true also for participants whose sponsors have left the system, unless the sponsor has a vested right to receive income. This also is true to the extent that a departed participant is not fully vested, the unvested portion of the revenue sharing would move to breakage pool 58.

The method and apparatus of the present invention are highly effective in creating a positive and culture in the real estate sales, leasing and management office and in a mortgage brokerage office. Agents can be effectively recruited and retained and the system creates a mechanism for profit centers for residual income upon death, disability or departure of an agent. The compression feature further keeps the revenue sharing concept a dynamic one in which the participants are not penalized by departures.

What is claimed is:

1. A method for compensating a plurality of participants comprising the steps of:
    forming a multi-level sales force based upon sponsoring of participants into the sales force, the multi-level sales force having at least some of the participants having sponsored at least two subsequent levels of participants into the sales force;
    collecting a royalty fee from the commission of each selling agent participant in the sales force based upon the revenue generated by the sale of real estate property by the selling agent participant;
    providing each participant a percentage of the revenue generated by the selling agent participant's sale of the real estate property;
    placing the collected fees into a revenue sharing pool; and
    distributing royalty fees from the revenue sharing pool to the participants based upon: (i) a first level percentage of the royalty fees paid into the revenue sharing pool by a first level of participants sponsored by a participant, plus (ii) a second level percentage of the royalty fees paid into the revenue sharing pool by a second level of participants sponsored by the first level of sponsored participants.

2. The method as defined in claim 1 wherein, the distributing step includes distributing a level percentage of the royalty fees paid into the revenue sharing pool for each subsequent level of sponsored participants beyond the second level of sponsored participants.

3. The method as defined in claim 2 wherein, the distributing step includes distributing royalty fees up to a seventh level percentage for seventh level sponsored participants.

4. The method as defined in claim 2 wherein, the distributing step is accomplished by distributing a first level percentage which is greater than all subsequent level percentages.

5. The method as defined in claim 4 wherein, the distributing step is accomplished by distributing a second level percentage which is greater than all subsequent level percentages.

6. The method as defined in claim 5 wherein, the distributing step is accomplished by distributing a first level percentage which is 40 percent of the royalty fees from sales by the first level of sponsored participants; a second level percentage which is 10 percent of the royalty fees from sales by the second level of sponsored participants; and a third level percentage through a highest level percentage which is 8 percent of the royalty fees from sales by the third level of sponsored participants through the highest level of sponsored participants.

7. The method as defined in claim 1 wherein, the distributing step is accomplished by distributing royalty fees for a second level of sponsored participant at the first level percentage in the event that the first level sponsored participant leaves the sales force at the time of performing the collecting step.

8. The method as defined in claim 2 wherein, the distributing step is accomplished by distributing royalty fees at a level percentage determined by reducing the original level percentage of the sponsored participant level by the number of prior level participants who have left the sales force at the time of performing the collecting step.

9. The method as defined in claim 1, and the step of: vesting a participant's right to receive royalty fees from the revenue sharing pool after leaving the sales force based upon a predetermined number of years of participation by a vesting percentage in the sales force.

10. The method as defined in claim 9 wherein, the vesting step is accomplished by increasing the vesting percentage over time after the predetermined number of years.

11. The method as defined in claim 10 wherein, the vesting percentage is accomplished by vesting the right to receive royalty fees from the revenue sharing pool by a vesting percentage of 20% after 3 years of participation in the sales force and increasing the vesting percentage by 20% more for each year of participation in the sales force over 3 years.

12. The method as defined in claim 9 wherein, the distributing step is accomplished for vested royalty fees for a participant who has died by distributing to the deceased participant's estate or heirs an amount which decreases over time.

13. The method as defined in claim 12 wherein, the distributing step is accomplished by distributing an amount which declines by 20% for each year after the deceased participant's death.

14. The method as defined in claim 1 wherein, the collecting step is accomplished by collecting a percentage of the sales commission of each participant for sales made as the royalty fee.

15. The method as defined in claim 14 wherein, the collecting step is accomplished by collecting a fixed percentage of the sales commission of each participant up to a maximum total royalty fee per year.

16. The method as defined in claim 14 wherein, the collecting step is accomplished by collecting no more than five percent of the sales commission as the royalty fee.

17. The method as defined in claim 1 wherein, the distributing step is accomplished by distributing an administrative percentage of the revenue sharing pool to a revenue pool administration entity.

18. The method as defined in claim 1 wherein, the distributing step is accomplished by distributing a development percentage of the revenue sharing pool to a sales area development entity.

19. The method as defined in claim 1 wherein, the distribution step is accomplished within a fixed period of time of the collecting step, and all the royalty fees are distributed at the time of the distributing step.

20. The method as defined in claim 19 wherein, the distribution step is accomplished with two months of the collecting step.

21. The method as defined in claim 19 wherein, the distributing step is accomplished by distributing any otherwise undistributed royalty fees to at least one bonus pool for redistribution to participants having at least a predetermined number of sponsored participants.

22. The method as defined in claim 2 wherein,
the collecting step is accomplished by collecting a fixed percentage of the sales commission for each participant up to a maximum total royalty fee per year; and
the distributing step is accomplished by distributing royalty fees from the revenue sharing pool:
  (i) at level percentages which decrease from the first level percentage to the second level percentage and from the second level percentage to the third level percentage;
  (ii) at a level percentage determined by reducing the original level percentage of the sponsored participant level by the number of prior level participants who have left the sales force at the time of performing the collecting step; and
  (iii) within a fixed period of time from the collecting step with all of the revenue sharing pool being distributed.

23. The method as defined in claim 22 wherein,
during the distributing step, distributing:
  (i) an administrative percentage of the revenue sharing pool to an administrative entity;
  (ii) a development percentage of the revenue sharing pool to a sales area development entity; and
  (iii) any otherwise undistributed royalty fees to a bonus pool for redistribution to participants having a predetermined plurality of sponsored participants.

24. The method as defined in claim 22, and the step of:
vesting a participant's right to receive royalties from the revenue sharing pool after leaving the sales force based upon the number of years the participant was in the sales force; and
the distributing step is accomplished for vested royalty fees and for participants who are deceased in an amount which decreases over time.

25. A data processing system for managing revenue sharing between a plurality of participants in a multi-level sales force comprising:
  a computer processor including a memory device for storing identifying data for each participant in at least a two level sales force, including the level of each participant relative to any sponsoring participant in the sales force by a participant already in the sales force; and
  a data processing program controlling operation of the computer processor and formed to process royalty fee data by determining a royalty fee from the commission of each selling agent participant in the sales force based upon the revenue generated by the sale of real estate property by the selling agent participant and allocating a portion of the royalty fees input as being paid by each selling agent participant based upon the revenue generated by the sale of real estate property by the participant into a revenue sharing pool among each sponsor participant in each level of the multi-level sales force earlier than the participant's level in order to output an amount of royalty fees to be shared by each participant.

26. The method as defined in claim 1 wherein, in the step of collecting a royalty fee from each participant, the royalty fee is a decreasing percentage of the revenue generated by the sale of real estate property by the participant as the participant's total sales increases.

27. A method for compensating a plurality of participants comprising the steps of:
  forming a multi-level sales force based upon sponsoring of participants into the sales force, the multi-level sales force having at least some of the participants having sponsored at least two subsequent levels of participants into the sales force;
  dividing each participant's fees from the revenue generated by the sale of real estate property by said each participant into a royalty fee and participant fee;
  distributing the participant fee to the participant that generated the real estate sale;
  placing the royalty fee into a revenue sharing pool; and
  distributing royalty fees from the revenue sharing pool to the participants based upon: (i) a first level percentage of the royalty fees paid into the revenue sharing pool by a first level of participants sponsored by a participant, plus (ii) a second level percentage of the royalty fees paid into the revenue sharing pool by a second level of participants sponsored by the first level of sponsored participants.

28. The method as defined in claim 27 wherein the royalty fee is less than 10% of each participant's fee from the revenue generated by the sale of real estate property by said each participant.

29. A method for compensating a plurality of participants comprising the steps of:
  forming a multi-level sales force based upon sponsoring of participants into the sales force, the multi-level sales force having at least some of the participants having sponsored at least two subsequent levels of participants into the sales force;
  determining the commission from the revenue generated by the sale of real estate property by a participant;
  dividing the commission into;
    seller fees
      for the selling agent
      for the selling broker
    listing fees
      for the listing agent
      for the listing broker
  extracting a royalty fee from the selling agent portion of the commission;
  placing the royalty fee into a revenue sharing pool; and
  distributing royalty fees from the revenue sharing pool to the participants based upon: (i) a first level percentage of the royalty fees paid into the revenue sharing pool by a first level of participants sponsored by a participant, plus (ii) a second level percentage of the royalty fees paid into the revenue sharing pool by a second level of participants sponsored by the first level of sponsored participants.

30. The method as defined in claim 29 wherein the royalty fee is less than 10% of the commission.

* * * * *